United States Patent
Shahidzadeh et al.

(10) Patent No.: US 9,530,027 B2
(45) Date of Patent: Dec. 27, 2016

(54) DEVICE LOCK FOR TRANSIT

(75) Inventors: Shahrokh Shahidzadeh, Portland, OR (US); Venkatesh Ramamurthy, Hillsboro, OR (US); Reinhard R. Steffens, Santa Clara, CA (US); Gyan Prakash, Beaverton, OR (US); Stephen L. Smith, Palo Alto, CA (US); Christian Von Reventlow, Palo Alto, CA (US); Farzad Esfandiari, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 13/996,608

(22) PCT Filed: May 11, 2012

(86) PCT No.: PCT/US2012/037592
§ 371 (c)(1),
(2), (4) Date: Mar. 26, 2015

(87) PCT Pub. No.: WO2013/169268
PCT Pub. Date: Nov. 14, 2013

(65) Prior Publication Data
US 2016/0224810 A1  Aug. 4, 2016

(51) Int. Cl.
G08B 29/00 (2006.01)
G06F 7/04 (2006.01)
(Continued)

(52) U.S. Cl.
CPC ............ *G06F 21/88* (2013.01); *G06F 21/44* (2013.01); *G06F 21/31* (2013.01); *H04L 9/3223* (2013.01); *H04L 63/08* (2013.01); *H04L 63/083* (2013.01)

(58) Field of Classification Search
CPC .......... G06F 21/88; G06F 21/31; H04L 63/08; H04L 63/083; H04L 9/3223
(Continued)

(56) References Cited

U.S. PATENT DOCUMENTS 7,689,204 B2    3/2010 Dupuis et al.
2004/0093502 A1* 5/2004 Shurygailo ........... H04L 63/104
                                                  713/183
(Continued)

FOREIGN PATENT DOCUMENTS

TW    201202528 A1    1/2012

OTHER PUBLICATIONS

International Preliminary Report on Patentability and Written Opinion received for PCT Patent Application No. PCT/US2012/037592, mailed on Nov. 20, 2014, 7 pages.
(Continued)

*Primary Examiner* — Aravind Moorthy
(74) *Attorney, Agent, or Firm* — Grossman, Tucker, Perreault & Pfleger, PLLC

(57) ABSTRACT

Generally, this disclosure describes providing theft deterrence for a device while in transit. The system may include lock state circuitry configured to receive and store an unlock token, the unlock token configured to indicate that an associated device has successfully completed transit from a source to a destination; and lock state read circuitry configured to request the unlock token from the lock state circuitry and to determine whether the associated device has successfully completed transit from the source to the destination based on the unlock token.

16 Claims, 5 Drawing Sheets

(51) Int. Cl.
  *H04L 9/32* (2006.01)
  *G06F 21/00* (2013.01)
  *G06F 21/88* (2013.01)
  *G06F 21/44* (2013.01)
  *G06F 21/31* (2013.01)
  *H04L 29/06* (2006.01)

(58) Field of Classification Search
  USPC .............. 726/20, 19, 34; 713/168, 181, 183
  See application file for complete search history.

(56) References Cited

U.S. PATENT DOCUMENTS

| | | | |
|---|---|---|---|
| 2005/0240498 A1* | 10/2005 | Thaler | G06Q 10/08 705/29 |
| 2007/0143824 A1 | 6/2007 | Shahbazi | |
| 2009/0249069 A1* | 10/2009 | Daskalopoulos | H04L 63/0869 713/169 |
| 2009/0303045 A1* | 12/2009 | Winter | G06Q 10/08 340/568.1 |
| 2010/0083386 A1* | 4/2010 | Kline | G06F 21/33 726/34 |
| 2010/0250949 A1* | 9/2010 | Torino | H04L 63/0823 713/176 |
| 2010/0255813 A1 | 10/2010 | Belrose et al. | |
| 2011/0159844 A1 | 6/2011 | Gillet et al. | |
| 2011/0307633 A1* | 12/2011 | Maietta | G06F 21/554 710/18 |

OTHER PUBLICATIONS

International Search Report and Written Opinion received for PCT Patent Application No. PCT/US2012/037592, mailed on Jan. 17, 2013, 10 Pages.

Search Report issued in Taiwanese Application No. 102115584, dated Aug. 8, 2016, with English translation.

\* cited by examiner

DEVICE LOCK FOR TRANSIT

FIELD

This disclosure relates to a device lock, more particularly a device lock for transit.

BACKGROUND

Theft of devices in transit from a manufacturer to a reseller or from a reseller to an end-user is a concern for a supply chain. Devices lost in-transit result in higher costs for manufacturers, resellers and ultimately consumers.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
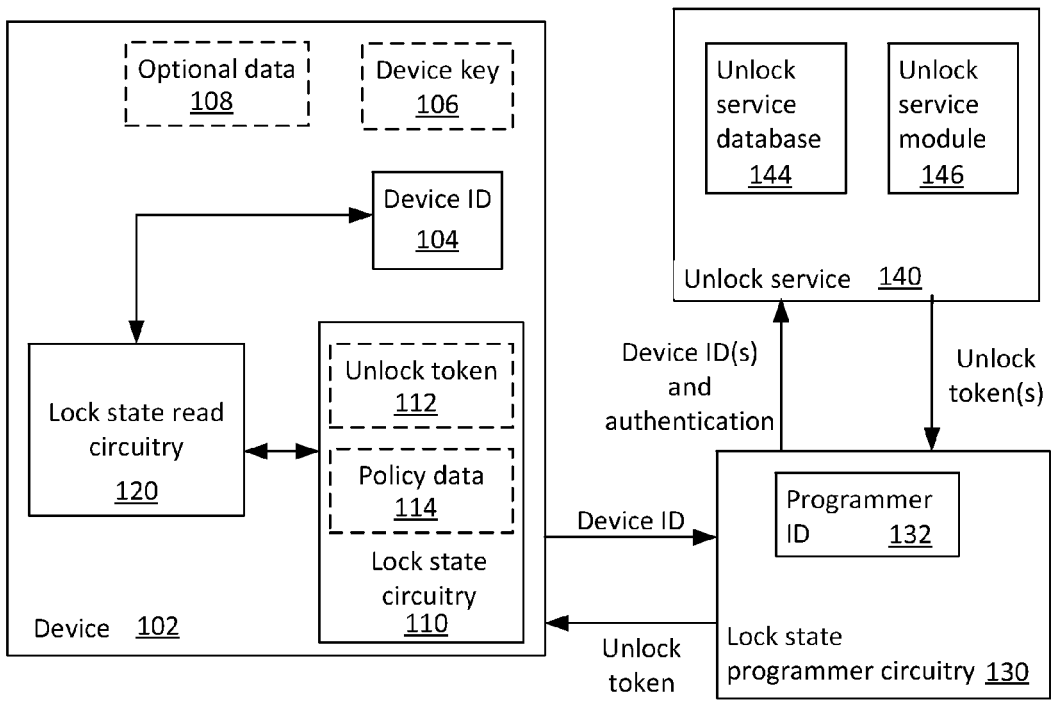
FIG. 1 illustrates a transit protection system consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to providing theft deterrence for a device while in transit. An apparatus, system and method consistent with the present disclosure are configured to prevent operation of devices in-transit. In-transit corresponds to device(s) that have been shipped from a source but have not yet reached their destination(s). Lock state circuitry may be included in and/or coupled to the device. Locked corresponds to not unlocked.

The lock state circuitry is configured to provide an OEM (original equipment manufacturer) and/or reseller the ability to lock the device without powering the device and without opening a package of the device. The lock state circuitry is configured to indicate a lock state to the device. The device is configured to detect the lock state via the lock state circuitry and to allow device operation if the lock state corresponds to unlocked. The device may prevent or limit operation, depending on policy, for example, if the lock state does not correspond to unlocked or the lock state corresponds to unlocked and the policy so indicates.

The lock state may be indicated by the presence of an unlock token stored in the lock state circuitry. The unlock token may be related to a device identifier (device ID) associated with the device. For example, the unlock token may correspond to a digital signature of the device ID. In this example, the lock state circuitry may be provisioned with the device ID and without the unlock token at manufacturing by the ODM (Original Device Manufacturer) or OEM.

In some embodiments, the lock state circuitry may be configured to store a plurality of unlock tokens. For example, a first unlock token may be provided to the lock state circuitry by a reseller after the reseller receives the device. A second unlock token may be provided to the lock state circuitry by an end-user after the end-user receives the device. The first unlock token may correspond to demonstration type operations and the second unlock token may correspond to full operation.

The respective unlock tokens may be provided to the reseller and the end-user by an unlock service (e.g., cloud service) in response to a request from the reseller or end-user. The reseller or end-user may provide the device ID to the unlock service. The unlock service may request authentication from the reseller or end-user prior to providing the unlock token. The authentication is configured to verify that the reseller or end-user legitimately possesses the device. If the unlock token is provided, the unlock token may then be stored in the lock state circuitry.

In this manner an unauthorized entity may be prevented from acquiring the unlock token. A device without an unlock token may then not operate properly, may operate with limitations or may not operate at all. Thus, devices acquired during transit by unauthorized entities may be prevented from operating so that any benefit of acquiring the devices is lost. Operation of a device with an unlock token may be limited based on policy, the unlock token and/or optional data, as described herein.

FIG. 1 illustrates a transit protection system 100 consistent with various embodiments of the present disclosure. The system 100 generally includes lock state circuitry 110, lock state read circuitry 120, lock state programmer circuitry 130 and unlock service 140. Lock state read circuitry 120 may be included in and/or coupled to device 102. For example, lock state read circuitry 120 may be included in a device BIOS. In another example, the lock state read circuitry 120 may be included in embedded firmware executing in integrated or external microcontroller. The device BIOS/firmware may be secured and/or protected by a secure firmware update mechanism, thus preventing unauthorized modification of the BIOS/firmware configured to thwart the transit protection system. In another example, lock state circuitry 110 may be coupled to device 102.

Lock state circuitry 110 is configured to be accessed by lock state programmer circuitry 130. For example, lock state circuitry 110 may be configured to communicate wirelessly with lock state programmer circuitry 130. For example, lock state programmer circuitry 130 may be an RFID (Radio frequency identification) programmer configured to read lock state circuitry 110 and to write data to lock state circuitry using RF.

Device 102 may include a device identifier device ID 104. Device ID 104 may be stored in the device 102 and/or may be stored in lock state circuitry 110. The device ID 104 is configured to identify device 102. For example, the device ID 104 may be a serial number configured to uniquely identify device 102. In another example, device ID 104 may include a lot or batch number or a platform number configured to identify a plurality of devices in one manufacturing lot (batch).

"Device" as used herein means any electronic device that is capable of reading the lock state and preventing or limiting operation based on the lock state. Devices may include, but are not limited to, computing devices, computing device components such as hard disk drives, processing units, application processors, baseband (i.e., circuitry, including programmable circuitry, for cellular data communication), central processing units (CPUs), graphics processing units (GPUs), chipsets, memory components, solid state devices, network adapters and/or consumer electronics devices, including, but not limited to Blu-ray players, televisions, receivers, and/or other consumer electronics devices.

Lock state circuitry 110 is configured to store an unlock token 112. In some embodiments, lock state circuitry 110 may be configured to store a plurality of unlock tokens. Lock state circuitry 110 is configured to be accessed by lock state read circuitry 120 to determine whether an unlock token is present and if present whether the unlock token is valid. Lock state circuitry 110 may be password protected to limit read access to, for example, lock state read circuitry 120.

Unlock token 112 is configured to indicate that device 102 has been successfully transferred from a manufacturer to a reseller and/or to an end-user. Generally, unlock token 112 is not configured to be provided to lock state circuitry 110 during manufacturing. Unlock token 112 may be related to device ID 104. For example, unlock token 112 may be derived from device ID 104. In some embodiments, device 102 may include device key 106 and/or optional data 108. Optional data 108 may include a platform identifier (ID), a batch or lot identifier and/or data configured to indicate an operating level of device 102 (e.g., to permit customization of device operation). In some embodiments, unlock token 112 may be related to optional data 108. For example, unlock token 112 may correspond to a digital signature, generated based on device ID 104 (and possibly optional data 108) using a private key of an asymmetric cryptographic key pair (public key/private key), as will be described in more detail below. In this example, device key 106 corresponds to a public key related to the private key.

Lock state read circuitry 120 is configured to determine whether a valid unlock token is stored in lock state circuitry 110. If lock state read circuitry 120 determines a valid unlock token is not stored in lock state circuitry 110, lock state read circuitry 120 is configured to prevent or limit operation of device 102, based at least in part on policy. For example, device 102 operation may be limited to demonstration type operations. In another example, device 102 operation may be time-limited, for example, to a number of minutes. In this example, providing time-limited operation is configured to allow time to request and possibly receive unlock token 112, permitting full operation of device 102.

In some embodiments, a device key 106 may be included in device 102. For example, the device key 106 may correspond to a public key of a public/private key pair. Public/private key pair corresponds to asymmetric cryptography. In another example, device key 106 may correspond to a shared secret key. In this example, the shared secret key may be included in secure storage on device 102. The type of device key 106 may depend on a technique/protocol utilized to implement a device lock in-transit.

For example, for a device key 106 that corresponds to a public key, the unlock token 112 may correspond to a digital signature. The digital signature may be related to device ID 104. For example, the digital signature may correspond to device ID 104 encrypted using a private key associated with the public key. Lock state read circuitry 120 may be configured to read the unlock token 112, decrypt the unlock token 112 using the public key 106. Lock state read circuitry 120 may then compare the decrypted signature with the device ID 104. If the decrypted signature matches the device ID 104, unlock token is valid and full operation of device 102 may be allowed. If the decrypted signature does not match the device ID 104, operation of device 102 may be prevented or limited.

In another example, the device key 106 may correspond to a shared secret key. The shared secret key may be associated with an unlock token 112 that corresponds to a password related to a hash-based message authentication code (HMAC). The HMAC is related to device ID 104 and may be related to optional data 108 such as a nonunique platform ID. For example, the HMAC may be generated at manufacturing by hashing the device ID 104, optionally the platform ID, and the shared secret key. A password may then be generated by, for example, truncating the HMAC to a predefined number of characters. For example, the number of characters may be in the range of eight to sixteen alphanumeric characters. The truncated HMAC corresponds to the unlock token in this example.

Continuing with this example, device 102 may include device ID 104 and the shared secret key (device key 106) in secure storage and may optionally include platform ID 108 prior to shipping. The unlock token (password) may not be stored in unlock circuitry 110. Device 102 may then be shipped to the destination, e.g., a reseller or end/user. The unlock token (password) may then be provided to the reseller or end-user separate from the provision of device 102. If the destination is the reseller, the reseller may write the password to the lock state circuitry 110 using lock state programmer circuitry 130, unlocking device 102. If the destination is an end-user, the end-user may be asked for the password upon initial device power up.

Upon device power up/boot, the lock state read circuitry 120 is configured to generate a device HMAC by a mechanism corresponding to the mechanism used at manufacturing and to truncate this device HMAC to the predefined number of characters to generate the device password. The lock state read circuitry 120 is then configured to compare the device password to the unlock token 112 (if it exists) or to request the password if the unlock token 112 does not exist. If the device password matches the unlock token 112 or the user-provided password, then the device 102 may be unlocked. If the user provided the password, then this password may be written to (stored in) lock state circuitry 110 as unlock token 112.

In this manner, device 102 may be unlocked at its destination by a reseller or an end-user. Once the password has been stored as unlock token 112, the user may no longer be prompted for the password. During subsequent boots (power ups), the lock state read circuitry 120 may determine the lock state of device 102 based on the unlock token 112 and the device password generated by the lock state read circuitry 120.

In one embodiment, a plurality of shared secret keys may be stored in secure storage on device 102. In another embodiment, one shared secret key may be stored in secure storage on device 102 and the HMAC may be generated based on the shared secret key. For example, the HMAC may be generated using the shared secret key rotated 128 bits or the HMAC result may be rotated prior to truncating. In another example, the unlock token may be generated based on the shared secret key using some other cryptographic technique. The lock state read circuitry may then be configured to perform the same cryptographic technique to determine whether the device 102 is unlocked.

For embodiments with a plurality of secret keys, a first secret key may be configured to unlock device 102 at a reseller and a second secret key second secret key may be configured to unlock device 102 at an end-user. Lock state read circuitry 120 may then be configured to determine whether unlock token 112 corresponds to the reseller or the end-user or a plurality of unlock tokens may be used: one unlock token corresponding to the reseller and another unlock token corresponding to the end-user.

Operation of device 102 may be allowed, limited (e.g., customized) or prevented based on policy. The policy may be indicated by the unlock token and/or policy data 114 that may be included in lock state circuitry 110. For example, the level of operation may be based on a stage in the supply chain of device 102. Level of operation includes, but is not limited to full, limited (e.g., demonstration) and none. For example, during transit from a manufacturer to a reseller, the unlock token may not be present or the populated unlock token may correspond to preventing operation of device 102. After device 102 reaches the reseller and the reseller requests the unlock token from, e.g., unlock service, based on the device ID 104, a programmer ID 132 and/or optional data 108, an unlock token corresponding to demonstration type operation may be provided. If the device is sold to an end-user, the unlock token associated with the end-user may correspond to full operation.

For example, lock state read circuitry 120 may be configured to generate the test unlock token based on different subsets of the optional data 108. Each subset of optional data may correspond to an operational level. The reseller and/or end-user may be provided the appropriate unlock token from unlock service. In another embodiment, lock state circuitry 110 may include an OTP (one-time programmable) flag, e.g., in policy data 114, configured to indicate whether operational mode corresponds to demonstration or full operation. The OTP flag may be cleared at manufacturing, indicating limited (e.g., demonstration) operation. The OTP flag state may be set for example by the reseller using lock state programmer circuitry 130 when device 102 is sold to the end-user and/or directly by the end user. The OTP flag being set may be configured to indicate full operation.

Thus, lock state read circuitry 120 is configured to prevent, limit or allow operation of device 102 based, at least in part, on unlock token 112 stored in lock state circuitry 110. In some embodiments, since the unlock token 112 may not be provisioned at manufacturing, the unlock token may not be present in lock state circuitry 110 during transit between a source (e.g., manufacturer) and a destination (e.g., reseller). Device 102 may then not be operational or may be capable of only limited operation based on policy. Such a device may have little value to an unauthorized entity providing a deterrent to unauthorized taking of the device. A first unlock token may be provided to device 102 at a reseller may be configured to allow limited operation based on policy. A second unlock token may be provided to the device 102 at an end-user configured to allow full or customized operation based on policy.

Lock state programmer circuitry 130 may include a programmer ID 132 configured to identify the lock state programmer circuitry 130. Lock state programmer circuitry 130 is configured to provide the unlock token 112 to lock state circuitry 110. Lock state programmer circuitry 130 may be temporarily coupled to lock state circuitry 110 in order to provide the unlock token 112 to lock state circuitry 110. For example, lock state programmer circuitry 130 may be configured to communicate wirelessly with lock state circuitry 110. Such wireless communication may include NFC (Near Field Communication), RFID, Bluetooth and/or other communication protocols. Lock state programmer circuitry 130 may be configured to request and/or read device ID 104 from device 102 and/or lock state circuitry 110. Lock state programmer circuitry 130 may be further configured to request a corresponding unlock token 112 from unlock service 140. The unlock token 112 may be a digital signature related to device ID 104. For example, the unlock token 112 may be a digital signature of the device ID 104. In another example, the unlock token 112 may be a digital signature of a combination of device ID 104, programmer ID 132 and any optional data 108. The unlock service 140 may be a cloud service. Lock state programmer circuitry 130 may then access the unlock service 140 via a network.

Unlock service 140 may include an unlock service database 144 and an unlock service module 146. The unlock service database 144 may be configured to store device IDs, for example, device ID 104, for manufactured devices that have been shipped to reseller and/or end-users and unlock tokens associated with the device IDs. In some embodiments, the unlock service database 144 may be configured to store private keys of public key/private key pairs used for generation of digital signatures related to (e.g., derived from) device IDs in the unlock service database 144. The unlock service database 144 may further include an indicator whether an unlock token corresponding to a device ID has been requested prior to a current request. Unlock service module 146 is configured to manage requests for unlock tokens from, for example, lock state programmers such as lock state programmer circuitry 130. Unlock service module 146 may be configured to manage requests for unlock tokens from end-users.

For example, lock state programmer circuitry 130 may request an unlock token from unlock service 140 for device 102. Lock state programmer circuitry 130 may read device ID 104 from lock state circuitry 110 prior to requesting the unlock token from unlock service 140. Lock state programmer circuitry 130 is configured to provide the device ID 104 to the unlock service 140. Lock state programmer circuitry 130 may provide the device ID 104 to the unlock service 140 with the request for the unlock token or in response to a request from the unlock service for the device ID 104.

Unlock service 140 may request authentication from lock state programmer circuitry 130. For example, in the case of unlock token provisioning by an end user, unlock service 140 may request an identifier associated with the lock state programmer circuitry 130 and/or device 102. For example, unlock service 140 may request an order number, a customer number and/or a lock state programmer ID from the lock state programmer circuitry 130 for authentication. If authentication is successful, the unlock service 140 is configured to provide the unlock token 112 to the lock state programmer circuitry 130. The lock state programmer circuitry 130 may then provide the unlock token 112 to lock state circuitry 110. Lock state circuitry 110 may then store the unlock token 112.

Lock state read circuitry 120 is configured to read the unlock token 112 at each power up or device 102 boot. It should be noted that the request for the unlock token 112 from the unlock service 140 should occur for the initial provisioning of the unlock token in the lock state circuitry 110. Subsequently, lock state read circuitry 120 may verify the unlock token 112 locally by verifying the unlock token, as described herein.

Figure 2:
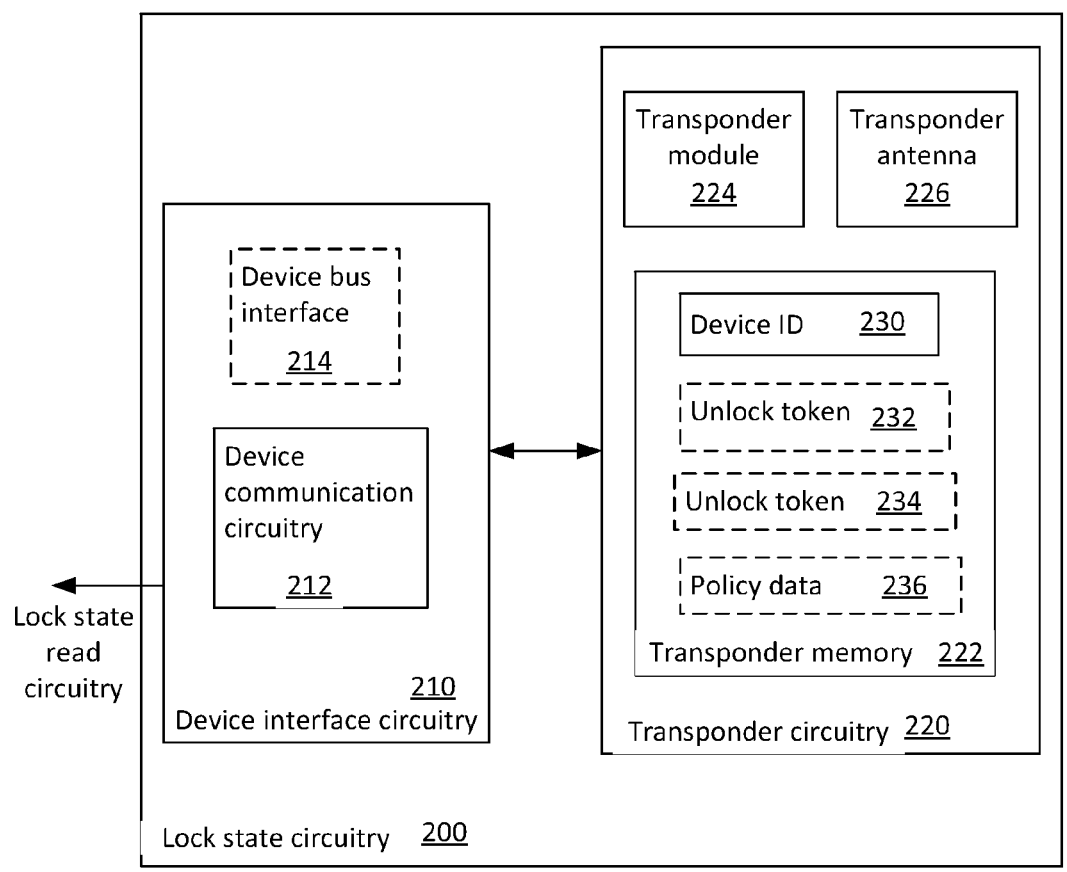
FIG. 2 illustrates lock state circuitry consistent with various embodiments of the present disclosure.

FIG. 2 illustrates lock state circuitry 200 consistent with various embodiments of the present disclosure. Lock state circuitry 200 corresponds to lock state circuitry 110 that is included in device 102 of FIG. 1. Lock state circuitry 200 includes device interface circuitry 210 and transponder circuitry 220. Device interface circuitry 210 is configured to provide an interface between lock state read circuitry 120 of device 102 and lock state circuitry 110. Transponder circuitry 220 is configured to communicate with lock state programmer circuitry 130, to provide the device ID to lock state programmer circuitry 130 and to receive one or more unlock tokens from lock state programmer circuitry 130.

Device interface circuitry 210 includes device communication circuitry 212 and may include a device bus interface 214. Device communication circuitry 212 is configured to manage communication between transponder circuitry 220 and lock state circuitry, e.g., lock state circuitry 120. For example, device communication circuitry 210 may read transponder memory 222 and provide read data to lock state circuitry 120 according to a specified communication protocol. Device bus interface 214 is configured to provide a bus interface between lock state circuitry 200 and lock state circuitry 120. Device bus interface 214 is configured to couple lock state circuitry 200 to lock state circuitry 120 in order to communicate lock state to lock state read circuitry 120. Thus, device bus interface 214 may be configured to interface to a corresponding bus structure of lock state circuitry 120 and to communicate according to a corresponding bus protocol. For example, the bus may correspond to an I$^2$C bus protocol. Other examples of bus protocols include, but are not limited to, SMBus, SPI, USB, one-wire and/or other bus protocols.

Transponder circuitry 220 includes transponder memory 222, transponder module 224 and transponder antenna 226. Transponder circuitry 220 is configured to communicate with lock state programmer circuitry 130 to request an unlock token, to provide device ID and to receive the unlock token. Transponder memory 222 is configured to store a device ID 230 and any received unlock token(s) 232, 234. Transponder memory 222 may include policy data 236. Transponder memory 222 may be one-time-programmable (OTP) (also known as write once/read many (WORM)) and/or may be partitioned such that one or more portions are independently OTP.

Transponder memory 222 may be configured to store a plurality of unlock tokens 232, 234. For example, a first unlock token 232 may be stored by a reseller that has legitimately received the device. Continuing with this example, a second unlock token 234 may be acquired and/or provisioned by an end-user that has legitimately acquired the device from the reseller. The device ID 230 may be stored in the transponder memory 222 at manufacturing. This device ID 230 may be in addition to the device ID 104 stored in device 102. Lock state read circuitry 120 may be configured to verify the unlock token using the device ID 104 stored in device 102. Transponder module 224 is configured to manage operation of the transponder circuitry 220 for communication with device interface circuitry 210 and/or lock state programmer circuitry 130. Transponder antenna 226 is configured to facilitate wireless communication between transponder circuitry 220 and lock state programmer circuitry 130. Wireless communication may include, but is not limited to, NFC (Near field communication), RFID (Radio frequency identification), Bluetooth, and/or some other wireless signal.

For example, transponder circuitry 220 may correspond to an RFID tag. Transponder circuitry 222 may be active or passive. Active corresponds to including its own battery or power supply and passive corresponds to receiving power (e.g., via antenna 226) from an external transmitter, e.g., lock state programmer circuitry 130 during communication. Continuing with this example, at least a portion of transponder memory 222 may then be configured as write once, read many (WORM), similar to one time programmable (OTP). In others words, once an unlock token has been stored in transponder memory 222 it may be read but not overwritten. Similarly, a device ID 230 written to (stored in) transponder memory 222 may not be overwritten.

Thus, lock state circuitry 200 is configured to communicate with lock state programmer circuitry 130 to acquire an unlock token and to communicate with the lock state read circuitry 120 to facilitate verification that the device, e.g., device 102, is legitimately active and has been successfully received at its designated destination.

Figure 3:
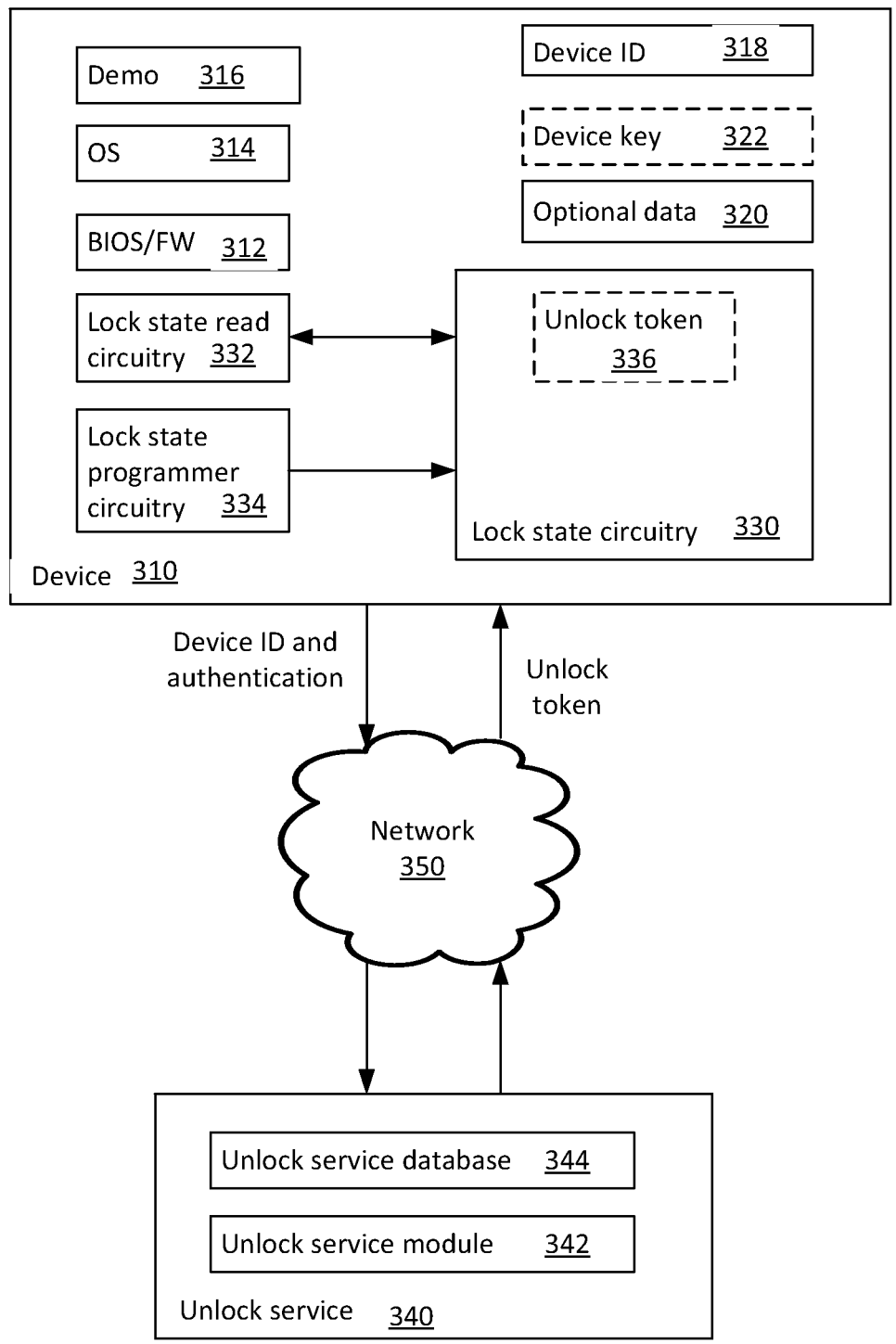
FIG. 3 illustrates an example of a transit protection system configured for a shipment to an end-user consistent with an embodiment of the present disclosure.

FIG. 3 illustrates an example of a transit protection system 300 configured for a shipment to an end-user consistent with an embodiment of the present disclosure. Transit protection system 300 includes lock state circuitry 330, lock state read circuitry 332, lock state programmer circuitry 334, unlock service 340 and network 350. In this example, lock state programmer circuitry is included in device 310. Network 350 is configured to couple device 310 and/or lock state programmer circuitry 334 to unlock service 340 in order to acquire unlock token 336. Unlock service 340 includes unlock service database 344 and unlock service module 342. The unlock service module 342 is configured to manage authenticating a requester and providing unlock tokens to authenticated requesters. The unlock service database 344 includes device IDs and may include public key/private key pairs, digital signatures and/or associated end-user and/or reseller identifiers. The unlock service database 344 may include optional data such as associated batch or lot identifiers and platform identifiers and may include lock state programmer identifiers.

In this example, lock state circuitry 330, lock state read circuitry 332 and lock state programmer circuitry 334 may be included in device 310. Device 310 may correspond to a computing device that includes firmware BIOS/FW 312, an operating system OS 314 and a device demonstration application Demo 316. The firmware BIOS/FW 312 may be stored in secure memory in device 310. Device 310 may include device ID 318, optional data 320 and a device key 322.

Continuing with this example, the device 310 may be received by an end-user without an unlock token 336. For example, the end-user may have purchased the device 310 online or via mail-order. As such, a reseller may have shipped the device 310 to the end-user. The device 310 may be protected in-transit by being configured for no or little operation without the unlock token. Further, while a reseller may typically have lock state programmer circuitry, e.g., lock state programmer circuitry 130, that is separate from the device, an end-user may not possess such circuitry. Thus, system 300 is configured to allow an end-user to acquire and store an unlock token 336.

Upon device 310 power up, prior to the operating system OS 314 becoming operational, BIOS/FW 312 is configured to operate. BIOS/FW 312 is configured to request that lock state read circuitry 332 determine whether a valid unlock token is stored in lock state circuitry 330, i.e., BIOS/FW 312 is configured to request that lock state read circuitry 332 determine the lock state of device 310. In this example, policy is configured to indicate limited operation for no or a not valid unlock token. Limited operation includes operation for a time period. The time period is configured to provide the end-user sufficient time to access the unlock service 340 and to acquire the unlock token 336.

Lock state programmer circuitry 334 is configured to request the unlock token from the lock state circuitry 330 via the lock state read circuitry 332 to determine whether the unlock token is present. If there is no valid unlock token, lock state programmer circuitry 334 is configured to access the unlock service 340 and/or to prompt user to provide authentication data. Authentication data may include a user identifier, a sales receipt number, a confirmation number and/or a number provided to the end-user by the reseller separate from the device 310. For example, the authentication data may be provided to the end-user via email, snail mail or some other mechanism. The user may enter the requested authentication data that may then be provided to the unlock service 340. If the authentication data corresponds to a device ID in the unlock service database 344, the unlock service 340 may provide the unlock token 336 to lock state programmer circuitry 334. The unlock token 336 may then be stored in lock state circuitry 330. The device ID 318 and unlock token 336 may be provided via the end-user (by entering device ID and a password corresponding to the unlock token) or may be provided directly to the unlock service 340 by the lock state programmer circuitry 334, without additional user action.

In another example, the end-user may be provided the unlock token (i.e., password) directly via email, snail mail or some other mechanism independent of the provision of the device 310. In this example, the lock state programmer circuitry 334 is configured to request the unlock token 336 from the end-user and to store the received unlock token in lock state circuitry 330.

After the unlock token 336 has been provisioned, lock state read circuitry 332 may verify whether the unlock token 336 is valid. For example, if the unlock token 336 is a digital signature encrypted by a private key corresponding to the public key 322, the lock state read circuitry 332 is configured to decrypt the signature 336 using public key 322 and to compare the result to the device ID 318. If they match, lock state circuitry read 332 is configured to communicate success to the BIOS/FW 312. The BIOS/FW 312 is configured to allow the OS to 314 launch and for device 310 to operate normally.

In another example, if the unlock token is a password associated with a truncated HMAC, the lock state read circuitry 332 is configured to generate the device HMAC, truncate the device HMAC and compare the truncated device HMAC to the user-provided password. If they match, lock state programmer circuitry 334 is configured to write the password to lock state circuitry 330 as the unlock token 336. Device 310 may then be unlocked and operational according to policy as described herein. Upon subsequent power ups, lock state read circuitry may be configured to verify that device 332 is unlocked by generating the device HMAC, truncating and comparing the truncated device HMAC to the unlock token 336.

Thus, transit security for a device acquired by an end-user from a remote reseller may be provided, consistent with the present disclosure. In this example, lock state programming capability may be included in the device. A transit protection system consistent with the present disclosure may include lock state circuitry, lock state read circuitry and lock state programmer circuitry. The lock state circuitry is configured to store an unlock token. The lock state programmer circuitry is configured to provide the unlock token to the lock state circuitry. The lock state read circuitry included in the device is configured to determine a locked/unlocked state of the associated device upon power-up based on the unlock token.

Figure 4:
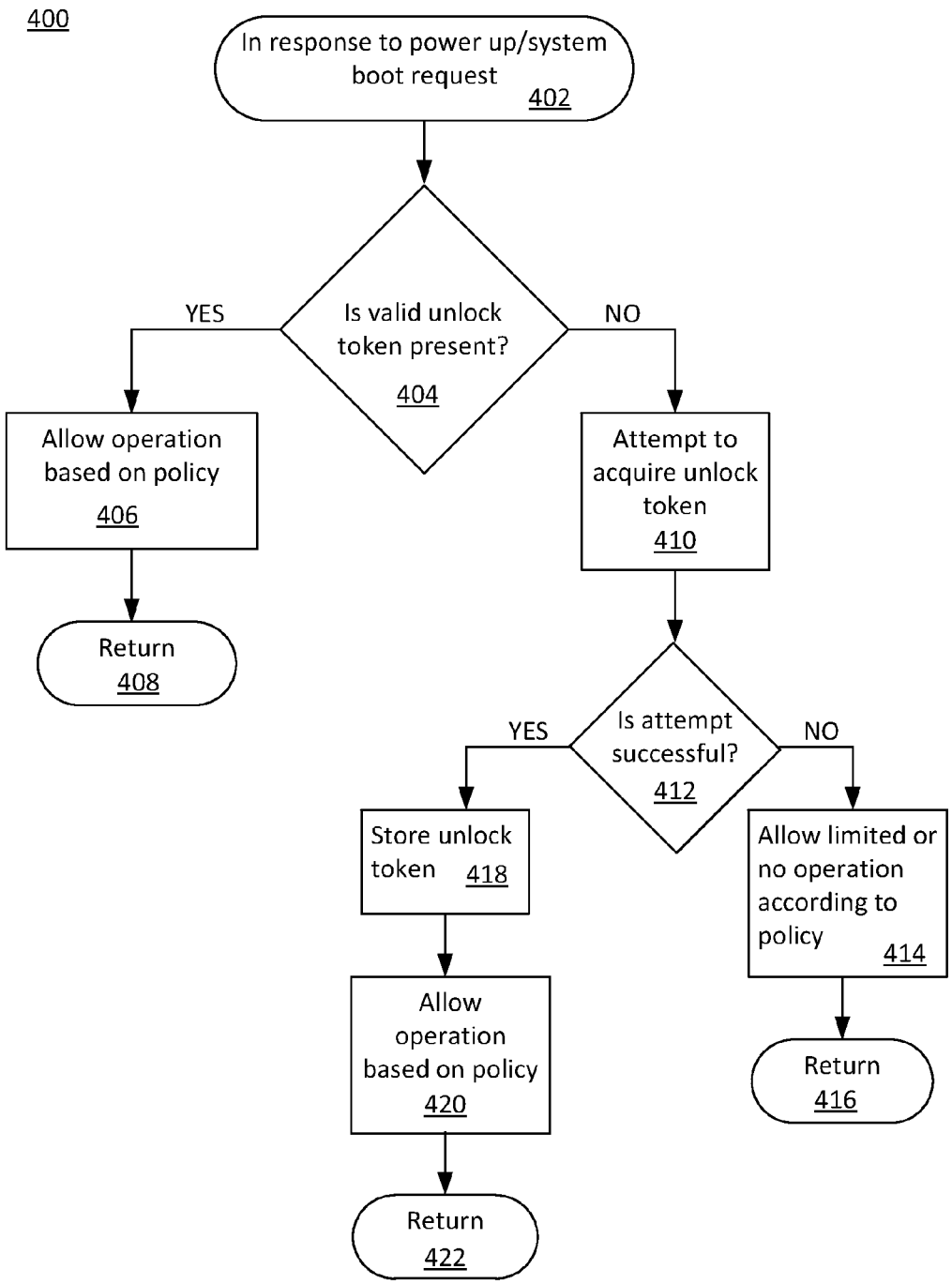
FIG. 4 illustrates a flowchart of exemplary operations for detecting a lock state of a device consistent with an embodiment of the present disclosure.

FIG. 4 illustrates a flowchart 400 of exemplary operations consistent with an embodiment of the present disclosure. The operations may be performed, for example, by the lock state read circuitry 120, 332 and/or lock state circuitry 110, 330. In particular, flowchart 400 depicts exemplary operations configured to determine whether a device is unlocked. The operations of flowchart 400 may be initiated 402 in response to a device power-up or device boot request. Operation 404 includes determining whether a valid unlock token is present. For example, operation 404 may include determining if an unlock token is stored in lock state circuitry. If an unlock token is found, operation 404 may further include determining whether the found unlock token is valid. For example, if the unlock token corresponds to a digital signature related to the device ID, operation 404 may include decrypting the digital signature using a public key stored on the device and comparing the decrypted digital signature with the device ID stored on the device. If the decrypted digital signature matches the stored digital signature then the unlock token may be deemed valid. In another example, if the unlock token corresponds to a truncated HMAC, a device HMAC may be generated using a shared secret key and truncated, as described herein. The truncated device HMAC may then be compared to the unlock token. If a valid unlock token is stored, operation of the device based on policy may be allowed at operation 406. For example, depending on the unlock token, policy may provide customized or full operation, as described herein. Program flow may return at operation 408.

If a valid unlock token is not present, acquiring an unlock token may be attempted at operation 410. For example, acquiring an unlock token may be attempted if no unlock token is stored or a stored unlock token does not correspond to the stored device ID. In either case, no valid unlock token is present. Acquiring the unlock token may be attempted, for example, by requesting the unlock token from an unlock service. Whether the attempt is successful may be determined at operation 412. If the attempt is unsuccessful, limited or no device operation may be allowed according to policy at operation 414. For example, policy may provide at least one of that the device not operate, the device operates properly but only for a limited amount of time and/or the device be configured only to perform demonstration type functions. Program flow may return at operation 416.

If the attempt to acquire the unlock token is successful, operation 418 may include storing the unlock token. For example, the unlock token may be stored in the lock state circuitry. Full (or limited/customized, depending on policy) operation of the device may be allowed at operation 420. For example, if the device is a computing device, the operating system may be allowed to launch. Program flow may return at operation 422.

Figure 5:
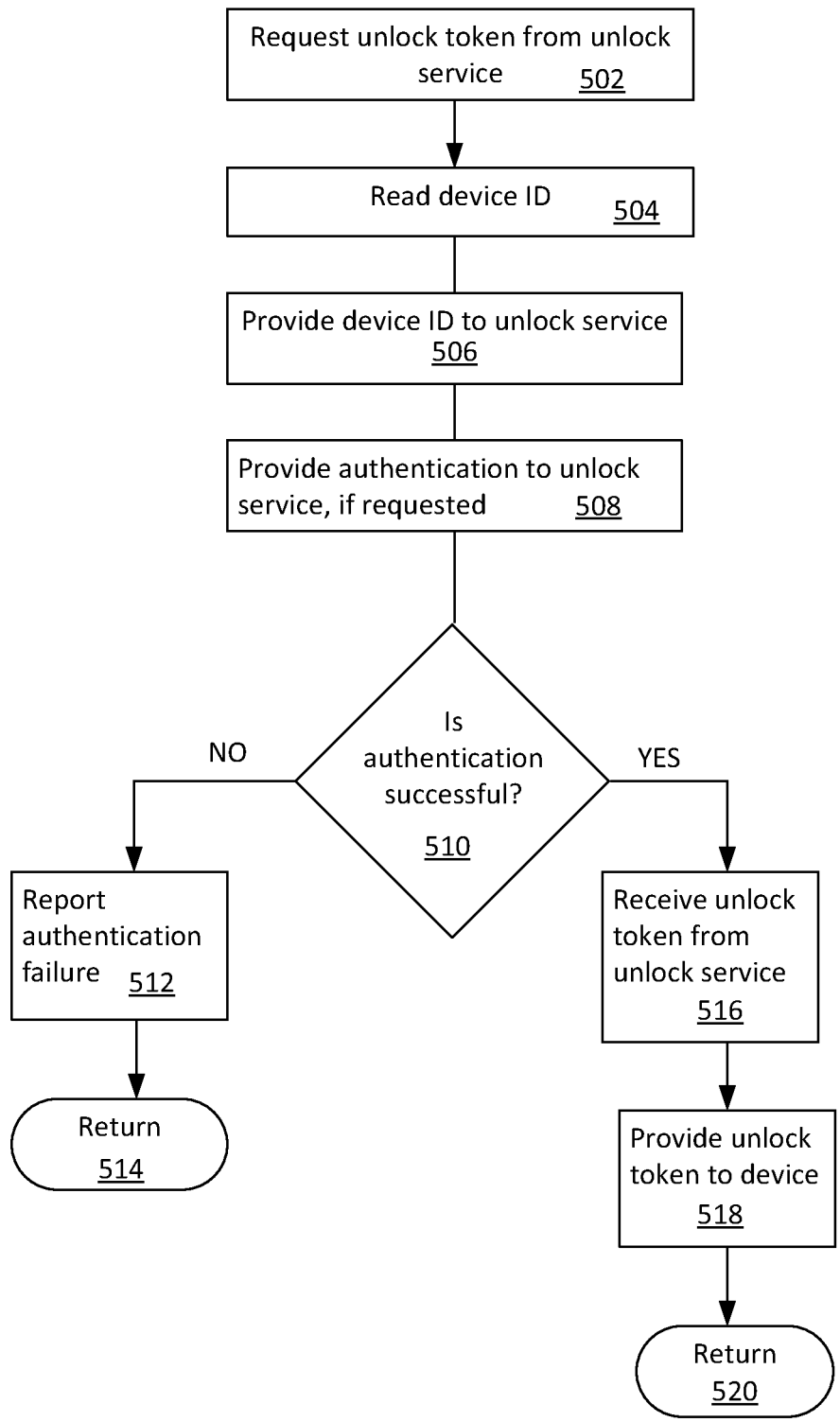
FIG. 5 illustrates a flowchart of exemplary operations for unlocking a device consistent with an embodiment of the present disclosure.

FIG. 5 illustrates a flowchart 500 of exemplary operations consistent with one embodiment of the present disclosure. The operations may be performed, for example, by lock state programmer circuitry 130, 332. In particular, flowchart 500 depicts exemplary operations configured to acquire an unlock token. Flowchart 500 corresponds to operation 410 of flowchart 400.

The operations of flowchart 500 may be initiated 502 in response to lock state read circuitry determining that no valid token is present or in response to a reseller using lock state programmer circuitry to unlock a device or device(s) received from a source of such devices. Operation 502 may include requesting an unlock token from an unlock service. A device ID may be read at operation 504. Operation 506 may include providing the device ID to the unlock service. For example, the unlock service may request the device ID. In another example, the device ID may be included in the request for the unlock token. Operation 508 may include providing authentication to the unlock service if the unlock service so requests. For example, the authentication may include a sales order number, a reseller ID and/or an end-user identifier.

Whether the authentication is successful may be determined at operation 510. If the authentication is not successful, the authentication failure may be reported at operation 512. For example, authentication failure may be displayed to an end-user or a reseller. Program flow may return at operation 514. If the authentication is successful, an unlock token may be received from the unlock service at operation 516. The unlock token may be provided to the device at operation 518. Program flow may return at operation 520.

The operations of flowchart 500 are configured to acquire an unlock token after the associated device has reached its destination. The associated device may not operate properly or may have limited functionality without the unlock token, e.g., during transit, and full functionality at the destination.

While FIGS. 4 and 5 illustrate various operations according various embodiments, it is to be understood that not all of the operations depicted in FIGS. 4 and 5 are necessary for other embodiments. Indeed, it is fully contemplated herein that in other embodiments of the present disclosure, the operations depicted in FIGS. 4 and 5 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical locations. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

Device(s) 102, 310 and lock state programmer circuitry 130, 334 may be configured to communicate with network 350 and/or unlock service 140, 340 using a variety of communication protocols. Lock state programmer circuitry 130 may be configured to communicate with lock state circuitry 110 using a variety of communication protocols. The communications protocols may include but are not limited to wireless communications protocols, such as NFC, RFID, Wi-Fi, Bluetooth, 3G, 4G and/or other communication protocols. The Wi-Fi protocol may comply or be compatible with the 802.11 standards published by the Institute of Electrical and Electronics Engineers (IEEE), titled "IEEE 802.11-2007 Standard, IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications" published, Mar. 8, 2007, and/or later versions of this standard.

The NFC and/or RFID communication signal and/or protocol may comply or be compatible with one or more NFC and/or RFID standards published by the International Standards Organization (ISO) and/or the International Electrotechnical Commission (IEC), including ISO/IEC 14443, titled: Identification cards—Contactless integrated circuit cards—Proximity cards, published in 2008; ISO/IEC 15693: Identification cards—Contactless integrated circuit cards—Vicinity cards, published in 2006, titled: ISO/IEC 18000, titled: Information technology—Radio frequency identification for item management, published in 2008; and/or ISO/IEC 18092, titled: Information technology—Telecommunications and information exchange between systems—Near Field Communication—Interface and Protocol, published in 2004; and/or later versions of these standards.

The Bluetooth protocol may comply or be compatible with the 802.15.1 standard published by the IEEE, titled "IEEE 802.15.1-2005 standard, IEEE Standard for Information technology—Telecommunications and information exchange between systems—Local and metropolitan area networks—Specific requirements Part 15.1: Wireless Medium Access Control (MAC) and Physical Layer (PHY) Specifications for Wireless Personal Area Networks (W Pans)", published in 2005, and/or later versions of this standard.

The 3G protocol may comply or be compatible with the International Mobile Telecommunications (IMT) standard published by the International Telecommunication Union (ITU), titled "IMT-2000", published in 2000, and/or later versions of this standard. The 4G protocol may comply or be compatible with IMT standard published by the ITU, titled "IMT-Advanced", published in 2008, and/or later versions of this standard.

For example, network 350 may comprise a packet switched network. Device(s) 102, 310 and lock state programmer circuitry 130, 334 may be capable of communicating with the unlock service 140, 340 using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternatively or additionally, device(s) 102, 310 and lock state programmer circuitry 130, 334 may be capable of communicating with the unlock service 140, 340, using an X.25 communications protocol. The X.25 communications protocol may comply or be compatible with a standard promulgated by the International Telecommunication Union-Telecommunication Standardization Sector (ITU-T). Alternatively or additionally, device(s) 102, 310 and lock state programmer circuitry 130, 334 may be capable of communicating with the unlock service 140, 340, using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, device(s) 102, 310 and lock state programmer circuitry 130, 334 may be capable of communicating with the unlock service 140, 340, using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed connection-oriented network communication protocols are equally contemplated herein.

Device bus interface 214 may be configured to communicate with lock state read circuitry and device 102, 310 using a variety of bus protocols. The bus protocols may include, but are not limited to, I²C bus, SMBus, USB, SPI, and/or one-wire protocol. I²C bus may comply or be compatible with I²C-Bus Specification, version 2.1, January 2000, published by Philips (NXP) Semiconductor and/or version 3.0, Rev. 03, Jun. 19, 2007, published by NXP Semiconductor and/or later versions of these specifications. SMBus may comply or be compatible with SMBus System Management Bus, version 2.0, August 2000, available from System Management Bus Interface Forum, Inc. and/or later versions of this specification. USB (Universal serial bus) may comply or be compatible with Universal Serial Bus Specification, Revision 2.0, published by the Universal Serial Bus organization, Apr. 27, 2000, and/or later versions of this specification. SPI corresponds to Serial peripheral interface bus. One-wire corresponds to a device communications bus system that provides low-speed data, signaling, and power over a single signal. One-wire allows one signal wire to carry both operating power and signal.

"Circuitry", as used in any embodiment herein, may comprise, for example, singly or in any combination, hard-wired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides an apparatus, method and system configured to prevent operation of devices in-transit. Lock state circuitry may be included in and/or coupled to the device. The lock state circuitry is configured to indicate a lock state to the device. The lock state may be indicated by the presence of an unlock token stored in the lock state circuitry. The device is configured to detect the lock state via the lock state circuitry and to allow device operation if the lock state corresponds to unlocked. The device may prevent or limit operation, depending on policy, for example, if the lock state does not correspond to unlocked or the lock state corresponds to unlocked and the policy so indicates.

According to one aspect there is provided a system. The system may include lock state circuitry configured to receive and store an unlock token, the unlock token configured to indicate that an associated device has successfully completed transit from a source to a destination; and lock state read circuitry configured to request the unlock token from the lock state circuitry and to determine whether the associated device has successfully completed transit from the source to the destination based on the unlock token.

Another example system includes the forgoing components and further includes lock state programmer circuitry configured to provide the unlock token to the lock state circuitry at the destination.

Another example system includes the forgoing components and the lock state programmer is configured to receive a device identifier from the lock state circuitry, the device identifier configured to uniquely identify the associated device, the unlock token related to the device identifier.

Another example system includes the forgoing components and the lock state programmer is configured to request the unlock token from an unlock service configured to provide the unlock token if an identity of the associated device is authenticated.

Another example system includes the forgoing components and the lock state read circuitry is configured to allow, limit or prevent operation of the associated device based, at least in part, on the unlock token.

Another example system includes the forgoing components and the unlock token corresponds to a digital signature derived from a device identifier using a private key and the lock state read circuitry is configured to verify the device digital signature using a public key stored in the device to determine whether the unlock token is valid.

Another example system includes the forgoing components and the unlock token corresponds to a password generated based on a hash-based message authentication code, the hash-based message authentication code based, at least in part, on a device identifier and a shared secret key and the lock state circuitry is configured to verify the password using the shared secret key stored in the device to determine whether the unlock token is valid.

Another example system includes the forgoing components and the lock state circuitry includes an RFID (radio frequency identification) module.

According to another aspect there is provided a method. The method may include receiving and storing an unlock token, the unlock token configured to indicate that an associated device has successfully completed transit from a source to a destination; and determining whether the associated device has successfully completed transit from the source to the destination based on the unlock token.

Another example method includes the forgoing operations and further includes requesting the unlock token from an unlock service configured to provide the unlock token if an identity of the associated device is authenticated.

Another example method includes the forgoing operations and further includes allowing, limiting or preventing operation of the associated device based, at least in part, on the unlock token.

Another example method includes the forgoing operations and the unlock token is received after the associated device has arrived at the destination.

Another example method includes the forgoing operations and further includes generating a device digital signature by an unlock service based on a device identifier and a private key, the device digital signature corresponding to the unlock token; and verifying the device digital signature using a public key stored in the device to determine whether the unlock token is valid.

Another example method includes the forgoing operations and further includes generating a password based on a hash-based message authentication code, the hash-based message authentication code based, at least in part, on a device identifier and a shared secret key; and verifying the password using the shared secret key stored in the device to determine whether the unlock token is valid, the password corresponding to the unlock token.

Another example method includes the forgoing operations and the source corresponds to a manufacturer of the associated device and the destination corresponds to at least one of a reseller and an end-user.

According to another aspect there is provided an apparatus. The apparatus may include lock state circuitry. The lock state circuitry may include transponder circuitry configured to receive and store an unlock token, the unlock token configured to indicate that an associated device has successfully completed transit from a source to a destination, and device interface circuitry configured to detect whether the unlock token is stored in the transponder circuitry in response to a request from lock state circuitry and to provide the unlock token to lock state read circuitry if the unlock token is present in the transponder circuitry.

Another example apparatus includes the forgoing components and the transponder circuitry is configured to receive the unlock token from lock state programmer circuitry at a reseller of the associated device.

Another example apparatus includes the forgoing components and the device interface circuitry is configured to receive a device identifier that uniquely identifies the associated device from the lock state read circuitry.

Another example apparatus includes the forgoing components and the transponder circuitry is an RFID (radio frequency identification) module.

Another example apparatus includes the forgoing components and the source corresponds to a manufacturer of the associated device and the destination corresponds to at least one of a reseller and an end-user.

Another example apparatus includes the forgoing components and the unlock token corresponds to a digital signature related to a device identifier of the associated device.

Another example apparatus includes the forgoing components and the unlock token corresponds to a password related to a device identifier of the associated device and a shared secret key.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system comprising:
   lock state circuitry configured to receive and store an unlock token, the unlock token configured to indicate that an associated device has successfully completed transit from a source to a destination; and
   lock state read circuitry configured to request the unlock token from the lock state circuitry and to determine whether the associated device has successfully completed transit from the source to the destination based on the unlock token;
   wherein the unlock token corresponds to a password generated based on a hash-based message authentication code, the hash-based message authentication code based, at least in part, on a device identifier and a shared secret key and the lock state circuitry is configured to verify the password using the shared secret key stored in the device to determine whether the unlock token is valid.

2. The system of claim 1, further comprising:
   lock state programmer circuitry configured to provide the unlock token to the lock state circuitry at the destination.

3. The system of claim 2, wherein the lock state programmer circuitry is configured to receive a device identifier from the lock state circuitry, the device identifier configured to uniquely identify the associated device, the unlock token related to the device identifier.

4. The system of claim 2, wherein the lock state programmer circuitry is configured to request the unlock token from an unlock service configured to provide the unlock token if an identity of the associated device is authenticated.

5. The system of claim 1, wherein the lock state read circuitry is configured to allow, limit or prevent operation of the associated device based, at least in part, on the unlock token.

6. The system of claim 1, wherein the lock state circuitry comprises an RFID (radio frequency identification) module.

7. A method comprising:
   receiving and storing an unlock token, the unlock token configured to indicate that an associated device has successfully completed transit from a source to a destination;
   determining whether the associated device has successfully completed transit from the source to the destination based on the unlock token;
   generating a password based on a hash-based message authentication code, the hash-based message authentication code based, at least in part, on a device identifier and a shared secret key; and
   verifying the password using the shared secret key stored in the device to determine whether the unlock token is valid, the password corresponding to the unlock token.

8. The method of claim 7, further comprising requesting the unlock token from an unlock service configured to provide the unlock token if an identity of the associated device is authenticated.

9. The method of claim 7, further comprising allowing, limiting or preventing operation of the associated device based, at least in part, on the unlock token.

10. The method of claim 7, wherein the unlock token is received after the associated device has arrived at the destination.

11. The method of claim 7, wherein the source corresponds to a manufacturer of the associated device and the destination corresponds to at least one of a reseller and an end-user.

12. An apparatus comprising:
   lock state circuitry comprising:
      transponder circuitry configured to receive and store an unlock token, the unlock token configured to indicate that an associated device comprising lock state circuitry has successfully completed transit from a source to a destination, and
      device interface circuitry configured to detect whether the unlock token is stored in the transponder circuitry in response to a request from lock state circuitry and to provide the unlock token to lock state read circuitry if the unlock token is present in the transponder circuitry;
   wherein the unlock token corresponds to a password generated based on a hash-based message authentication code, the hash-based message authentication code based, at least in part, on a device identifier and a shared secret key and the unlock token is configured to cause the lock state circuitry to verify the password using the shared secret key stored in the associated device to determine whether the unlock token is valid.

13. The apparatus of claim 12, wherein the transponder circuitry is configured to receive the unlock token from lock state programmer circuitry at a reseller of the associated device.

14. The apparatus of claim 12, wherein the device interface circuitry is configured to receive a device identifier that uniquely identifies the associated device from the lock state read circuitry.

15. The apparatus of claim 12 wherein the transponder circuitry is an RFID (radio frequency identification) module.

16. The apparatus of claim 12, wherein the source corresponds to a manufacturer of the associated device and the destination corresponds to at least one of a reseller and an end-user.

* * * * *